United States Patent
Vosoughi et al.

(10) Patent No.: US 11,587,263 B2
(45) Date of Patent: *Feb. 21, 2023

(54) METHOD AND APPARATUS FOR ENHANCED PATCH BOUNDARY IDENTIFICATION FOR POINT CLOUD COMPRESSION

(71) Applicant: TENCENT AMERICA LLC, Palo Alto, CA (US)

(72) Inventors: Arash Vosoughi, San Jose, CA (US); Sehoon Yea, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,204

(22) Filed: Aug. 16, 2021

(65) Prior Publication Data

US 2021/0383574 A1 Dec. 9, 2021

Related U.S. Application Data

(63) Continuation of application No. 16/803,093, filed on Feb. 27, 2020, now Pat. No. 11,127,166.

(Continued)

(51) Int. Cl.
*G06T 9/00* (2006.01)
*H04N 13/161* (2018.01)
(Continued)

(52) U.S. Cl.
CPC .............. *G06T 9/00* (2013.01); *H04N 13/161* (2018.05); *G06K 9/6218* (2013.01); *G06T 5/002* (2013.01);
(Continued)

(58) Field of Classification Search
None
See application file for complete search history.

(56) References Cited

U.S. PATENT DOCUMENTS

| 9,870,056 B1 | 1/2018 | Yao |
| 2005/0052452 A1 | 3/2005 | Baumberg |

(Continued)

FOREIGN PATENT DOCUMENTS

WO 2019/034807 A1 2/2019

OTHER PUBLICATIONS

Irene Reisner-Kollman, "Reconstruction of 3D Models From Images and Point Clouds with Shape Primitives", Vienna University of Technology, Feb. 18, 2013, Retrieved from the Internet: <URL: https://publik.tuwien.ac.at/files/PubDat_220568.pdf>; pp. 1-100 ( 97 pages total).

(Continued)

*Primary Examiner* — Stefan Gadomski
(74) *Attorney, Agent, or Firm* — Sughrue Mion, PLLC

(57) ABSTRACT

A method and apparatus for decoding a video stream encoded using video point cloud coding, the decoding including obtaining a geometry-reconstructed point cloud based on one or more patches; identifying a first boundary of a patch including a plurality of first boundary points; identifying a second boundary including a plurality of second boundary points inside the first boundary; performing smoothing on the first boundary points and the second boundary points; obtaining a smoothed geometry-reconstructed point cloud based on the smoothed first boundary points and the smoothed second boundary points; and reconstructing a dynamic point cloud using the smoothed geometry-reconstructed point cloud.

20 Claims, 9 Drawing Sheets

Related U.S. Application Data

(60) Provisional application No. 62/812,962, filed on Mar. 1, 2019.

(51) Int. Cl.
*G06T 5/00* (2006.01)
*G06K 9/62* (2022.01)
*G06T 7/50* (2017.01)
*G06V 10/75* (2022.01)

(52) U.S. Cl.
CPC .............. *G06T 7/50* (2017.01); *G06T 9/001* (2013.01); *G06T 2210/56* (2013.01); *G06V 10/751* (2022.01)

(56) References Cited

U.S. PATENT DOCUMENTS

| | | |
|---|---|---|
| 2006/0028480 A1 | 2/2006 | Engel |
| 2013/0173230 A1 | 7/2013 | Carbonera et al. |
| 2016/0086353 A1 | 3/2016 | Lukac et al. |
| 2017/0091994 A1 | 3/2017 | Beeler et al. |
| 2017/0091996 A1 | 3/2017 | Wei et al. |
| 2017/0219336 A1 | 8/2017 | Kurtz et al. |
| 2017/0347120 A1 | 11/2017 | Chou et al. |
| 2018/0053324 A1 | 2/2018 | Cohen et al. |
| 2018/0058861 A1 | 3/2018 | Doria et al. |
| 2018/0061069 A1 | 3/2018 | Higaki et al. |
| 2019/0007684 A1 | 1/2019 | Van Der Auwera |
| 2019/0087978 A1 | 3/2019 | Tourapis et al. |
| 2019/0087979 A1 | 3/2019 | Mammou et al. |
| 2019/0122376 A1 | 4/2019 | Xi et al. |
| 2019/0156518 A1 | 5/2019 | Mammou et al. |
| 2019/0156519 A1 | 5/2019 | Mammou et al. |
| 2019/0156520 A1 | 5/2019 | Mammou et al. |
| 2019/0191167 A1 | 6/2019 | Drugeon et al. |
| 2019/0279420 A1 | 9/2019 | Moreno et al. |
| 2019/0318509 A1 | 10/2019 | Budagavi et al. |
| 2019/0335207 A1 | 10/2019 | Abe et al. |
| 2020/0004225 A1 | 1/2020 | Buller et al. |
| 2020/0020133 A1* | 1/2020 | Najaf-Zadeh ............. G06T 7/50 |
| 2020/0210540 A1 | 7/2020 | Bala et al. |
| 2020/0242832 A1 | 7/2020 | Yamamoto et al. |
| 2020/0258202 A1 | 8/2020 | Cai et al. |
| 2020/0265552 A1 | 8/2020 | Hemmer et al. |

OTHER PUBLICATIONS

Written Opinion of the International Searching Authority dated Jun. 11, 2020, in International Application No. PCT/US20/20478.
International Search Report dated Jun. 11, 2020, in International Application No. PCT/US20/20478.
Supplementary European Search Report dated Apr. 19, 2022 in Application No. 20766431.9.
Extended European Search Report dated Mar. 29, 2022 in Application No. 20766431.9.
3DG, "V-PCC Codec description", ISO/IEC JTC1/SC29/WG11 MPEG2018/N18017, Oct. 2018, Macau, CN (32 pages total).
Arash Vosoughi et al., "[V-PCC] CE2.20-related: New proposal on occupancy map recovery using scalable locally adaptive erosion filter", ISO/IEC JTC1/SC29/WG11 MPEG2019/m46347, Jan. 2019, Marrakesh, Morocco (8 pages total).
Arash Vosoughi et al., "[V-PCC][New Proposal] Improved boundary identification", ISO/IEC JTC1/SC29/WG11 MEPG2018/m47802, Mar. 2019, Geneva, Switzerland (4 pages total).

* cited by examiner

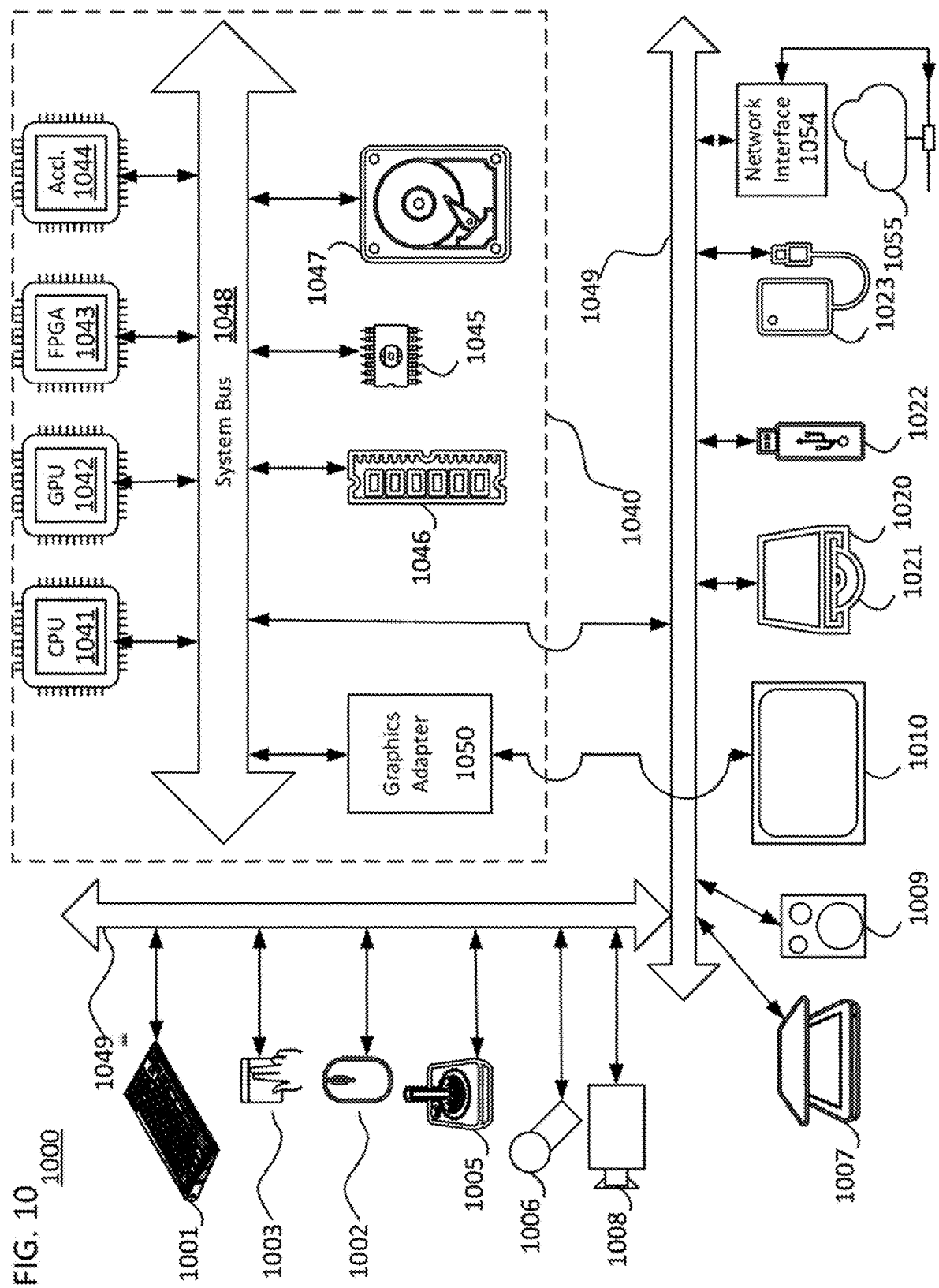

METHOD AND APPARATUS FOR ENHANCED PATCH BOUNDARY IDENTIFICATION FOR POINT CLOUD COMPRESSION

CROSS-REFERENCE TO RELATED APPLICATION

This application is a continuation of U.S. application Ser. No. 16/803,093, filed on Feb. 27, 2020, which claims priority from U.S. Provisional Application No. 62/812,962, filed on Mar. 1, 2019, the disclosures of which are incorporated herein by reference in their entireties.

FIELD

This disclosure is directed to a set of advanced video coding technologies, more specifically, video based point cloud compression.

BACKGROUND

Advanced three-dimensional (3D) representations of the world are enabling more immersive forms of interaction and communication. They also allow machines to understand, interpret, and navigate our world. Point clouds have been widely used as a 3D representation of the world. Several use cases associated with point cloud data have been identified, and some corresponding requirements for point cloud representation and compression have been developed.

A point cloud may be a set of points in a 3D space, each with associated attributes, e.g. color, material properties, etc. Point clouds can be used to reconstruct an object or a scene as a composition of such points. They can be captured using multiple cameras and depth sensors in various setups and may be made up of thousands up to billions of points in order to realistically represent reconstructed scenes.

Compression technologies are needed to reduce the amount of data required to represent a point cloud. As such, technologies may be needed for lossy compression of point clouds for use in real-time communications and six Degrees of Freedom (DoF) virtual reality. In addition, technology is sought for lossless point cloud compression in the context of dynamic mapping for autonomous driving and cultural heritage applications, etc. MPEG has started working on a standard to address compression of geometry and attributes such as colors and reflectance, scalable/progressive coding, coding of sequences of point clouds captured over time, and random access to subsets of the point cloud.

SUMMARY

According to an embodiment, a method of decoding a video stream encoded using video point cloud coding, is performed by at least one processor and includes obtaining a geometry-reconstructed point cloud based on one or more patches; identifying a first boundary of a patch from among the one or more patches, wherein the first boundary includes a plurality of first boundary points; identifying a second boundary of the patch inside the first boundary, wherein the second boundary includes a plurality of second boundary points; performing smoothing on the plurality of first boundary points and the plurality of second boundary points; obtaining a smoothed geometry-reconstructed point cloud based on the smoothed plurality of first boundary points and the smoothed plurality of second boundary points; and reconstructing a dynamic point cloud using the smoothed geometry-reconstructed point cloud.

According to an embodiment, an apparatus for decoding a video stream encoded using video point cloud coding includes at least one memory configured to store program code; and at least one processor configured to read the program code and operate as instructed by the program code, the program code including first obtaining code configured to cause the at least one processor to obtain a geometry-reconstructed point cloud based on one or more patches; first identifying code configured to cause the at least one processor to identify a first boundary of a patch from among the one or more patches, wherein the first boundary includes a plurality of first boundary points; second identifying code configured to cause the at least one processor to identify a second boundary of the patch inside the first boundary, wherein the second boundary includes a plurality of second boundary points; smoothing code configured to cause the at least one processor to perform smoothing on the plurality of first boundary points and the plurality of second boundary points; second obtaining code configured to cause the at least one processor to obtain a smoothed geometry-reconstructed point cloud based on the smoothed plurality of first boundary points and the smoothed plurality of second boundary points; and reconstructing code configured to cause the at least one processor to reconstruct a dynamic point cloud using the smoothed geometry-reconstructed point cloud.

According to an embodiment, a non-transitory computer-readable medium stores computer instructions decoding a video stream encoded using video point cloud coding that, when executed by at least one processor, cause the at least one processor to: obtain a geometry-reconstructed point cloud based on one or more patches; identify a first boundary of a patch from among the one or more patches, wherein the first boundary includes a plurality of first boundary points; identify a second boundary of the patch inside the first boundary, wherein the second boundary includes a plurality of second boundary points; perform smoothing on the plurality of first boundary points and the plurality of second boundary points; obtain a smoothed geometry-reconstructed point cloud based on the smoothed plurality of first boundary points and the smoothed plurality of second boundary points; and reconstruct a dynamic point cloud using the smoothed geometry-reconstructed point cloud.

BRIEF DESCRIPTION OF THE DRAWINGS

Further features, the nature, and various advantages of the disclosed subject matter will be more apparent from the following detailed description and the accompanying drawings in which:

FIG. 10 is a diagram of a computer system suitable for implementing embodiments.

DETAILED DESCRIPTION

A consideration behind video-based point cloud compression (V-PCC) is to leverage existing video codecs to compress the geometry, occupancy, and texture of a dynamic point cloud as three separate video sequences. The extra metadata needed to interpret the three video sequences may be compressed separately. A small portion of the overall bitstream is the metadata, which could be encoded/decoded efficiently using software implementation. The bulk of the information may be handled by the video codec.

With reference to FIGS. 1-4, an embodiment of the present disclosure for implementing encoding and decoding structures of the present disclosure are described. The encoding and decoding structures of the present disclosure may implement aspects of V-PCC described above.

Figure 1:
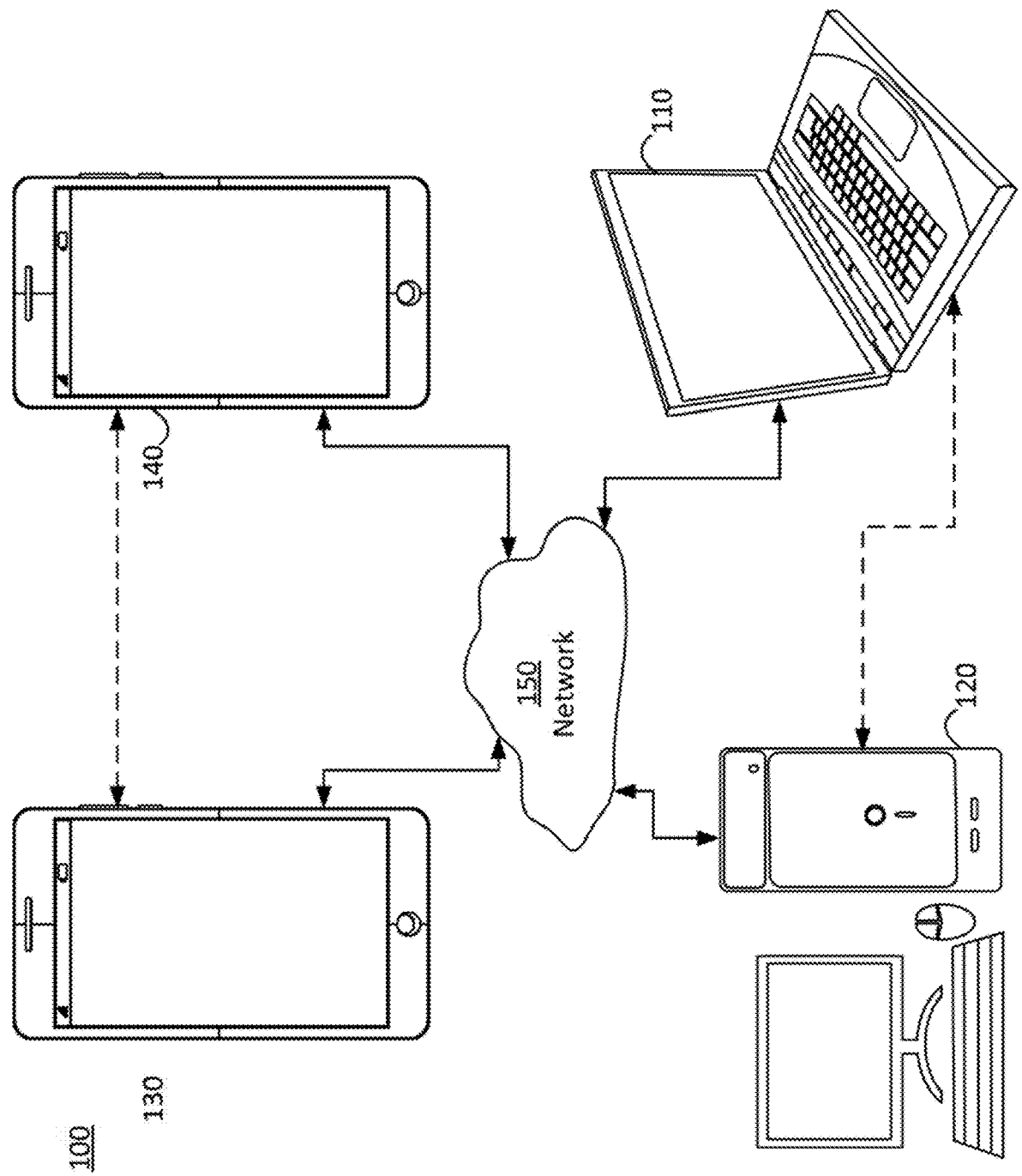
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
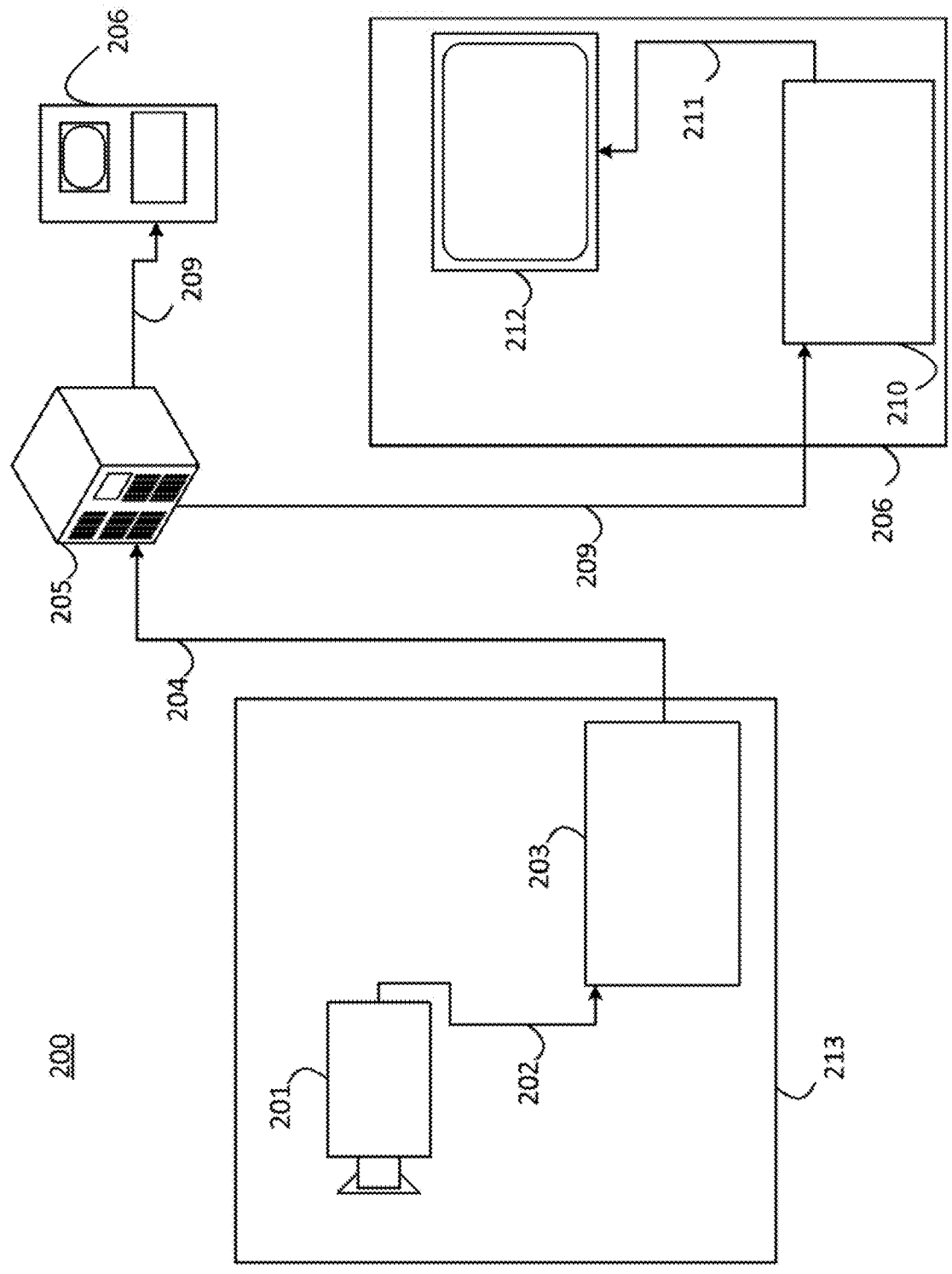
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D point cloud corresponding to a 3D video. The video source 201 may include, for example, 3D sensors (e.g. depth sensors) or 3D imaging technology (e.g. digital camera(s)), and a computing device that is configured to generate the 3D point cloud using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265, Versatile Video Coding (VVC), and MPEG/V-PCC.

Figure 3:
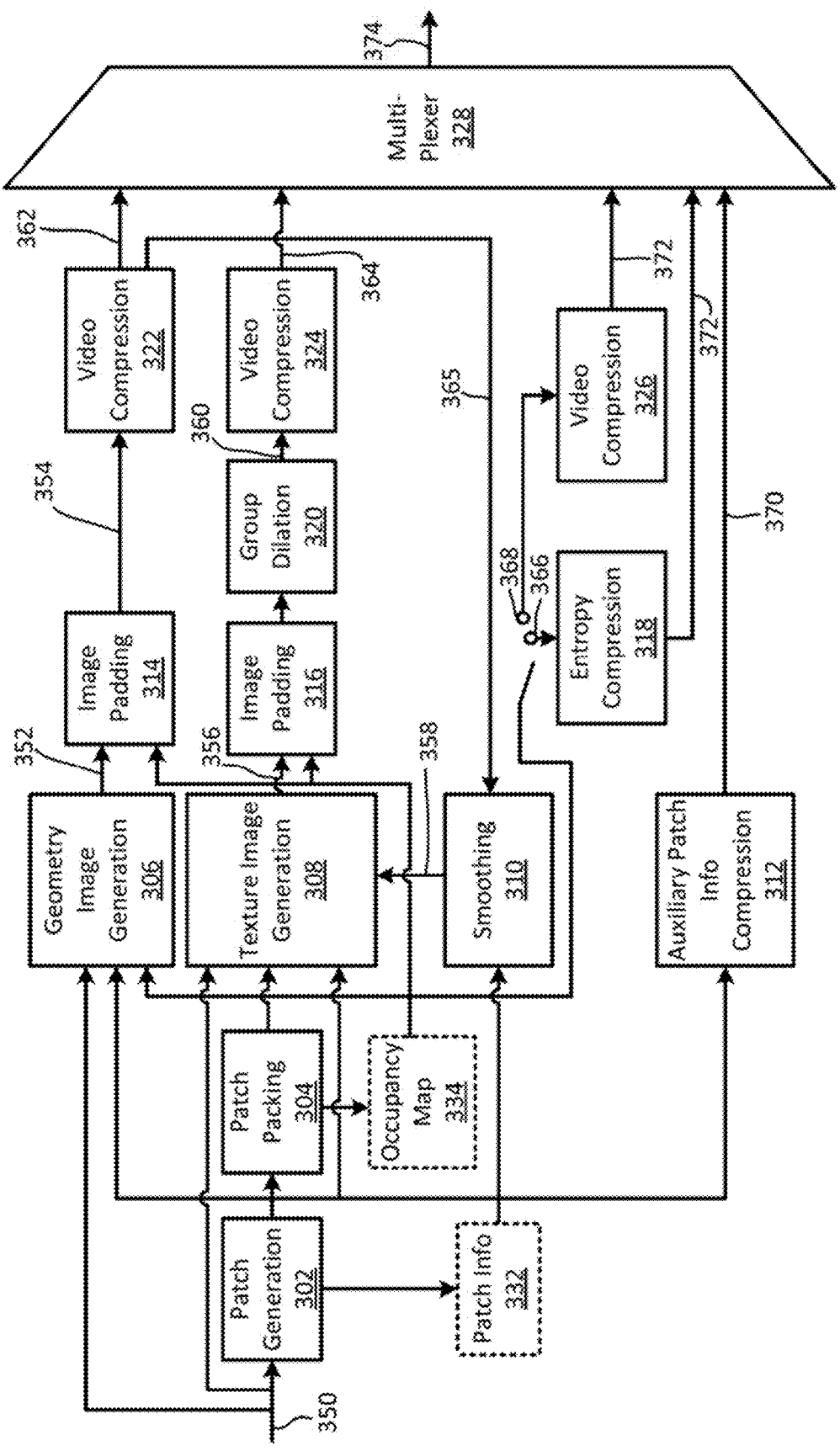
FIG. 3 is a schematic illustration of a simplified block diagram of a video encoder in accordance with an embodiment.
Figure 4:
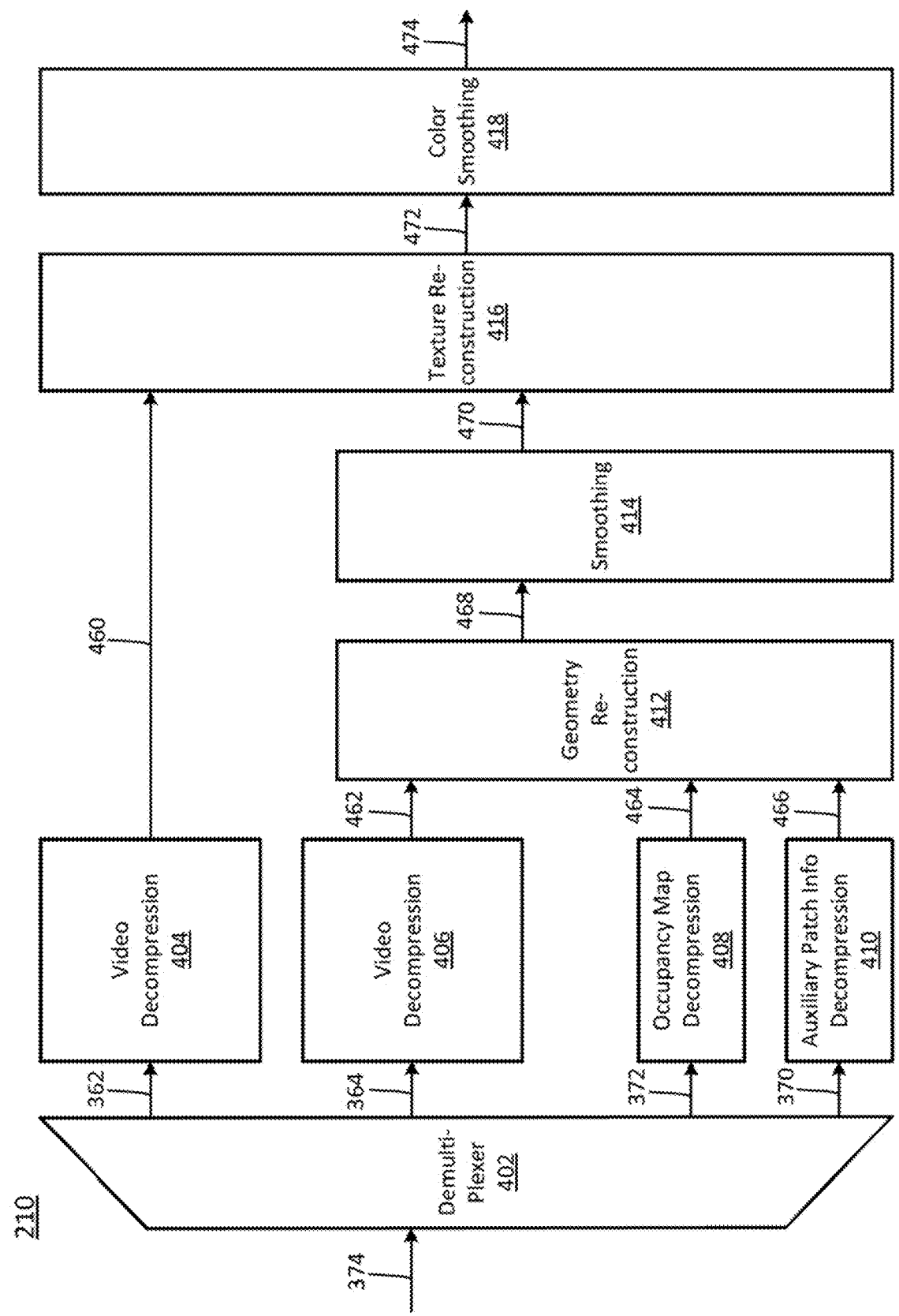
FIG. 4 is a schematic illustration of a simplified block diagram of a video decoder in accordance with an embodiment.

With reference to FIGS. 3-4, some aspects of V-PCC that may be performed by embodiments of the present disclosure are described below.

FIG. 3 illustrates an example functional block diagram of a video encoder 203 according to an embodiment of the present disclosure.

As illustrated in FIG. 3, the video encoder 203 may receive a point cloud frame(s) 350, and generate a geometry image 352, a texture image 356, and an occupancy map 334 based on the point cloud frame 350. The video encoder 203 may compress the geometry image 352 into a compressed geometry image 362, the texture image 356 into a compressed texture image 364, and the occupancy map 334 into a compressed occupancy map 372. A multiplexer 328 of the video encoder 203 may form a compressed bitstream 374 that includes the compressed geometry image 362, the compressed texture image 364, and the compressed occupancy map 372.

More specifically, in embodiments, the video encoder 203 may include a patch generation module 302 that segments the point cloud frame 350 into patches. Patches are useful entities of V-PCC. The patch generation process includes decomposing the point cloud frame 350 into a minimum number of patches with smooth boundaries, while also minimizing the reconstruction error. Encoders of the present disclosure may implement various methods to generate such a decomposition.

The video encoder 203 may include a patch packing module 304 that performs a packing process. The packing process includes mapping the extracted patches onto a 2D grid while minimizing the unused space and guaranteeing that every M×M (e.g., 16×16) block of the grid is associated with a unique patch. Efficient patch packing directly impacts the compression efficiency either by minimizing the unused space or ensuring temporal consistency. The patch packing module 304 may generate the occupancy map 334.

The video encoder 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

Figure 6:
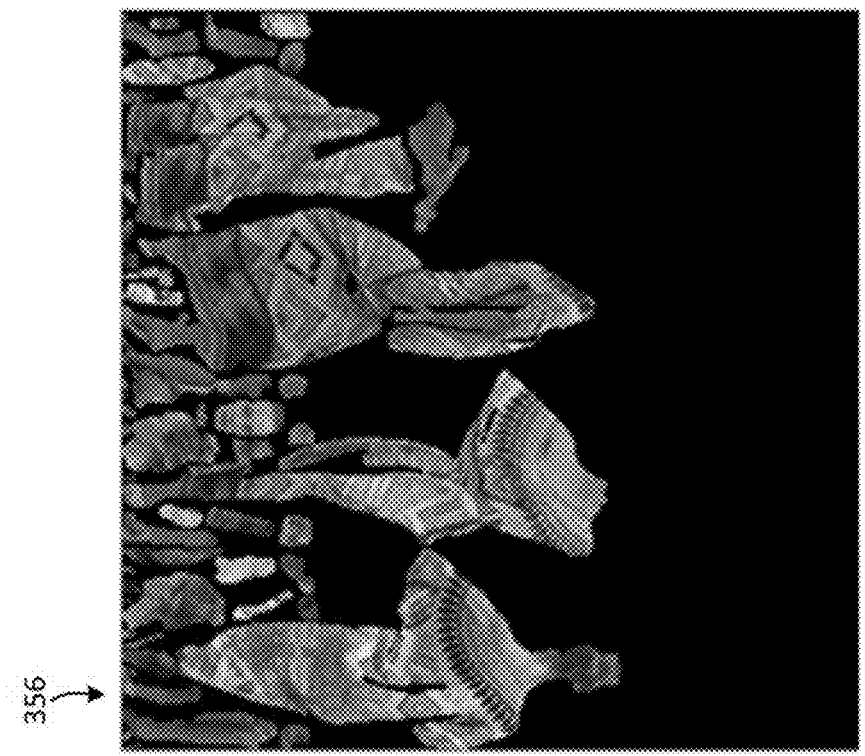
FIG. 6 illustrates an example of a texture image in accordance with an embodiment.
Figure 5:
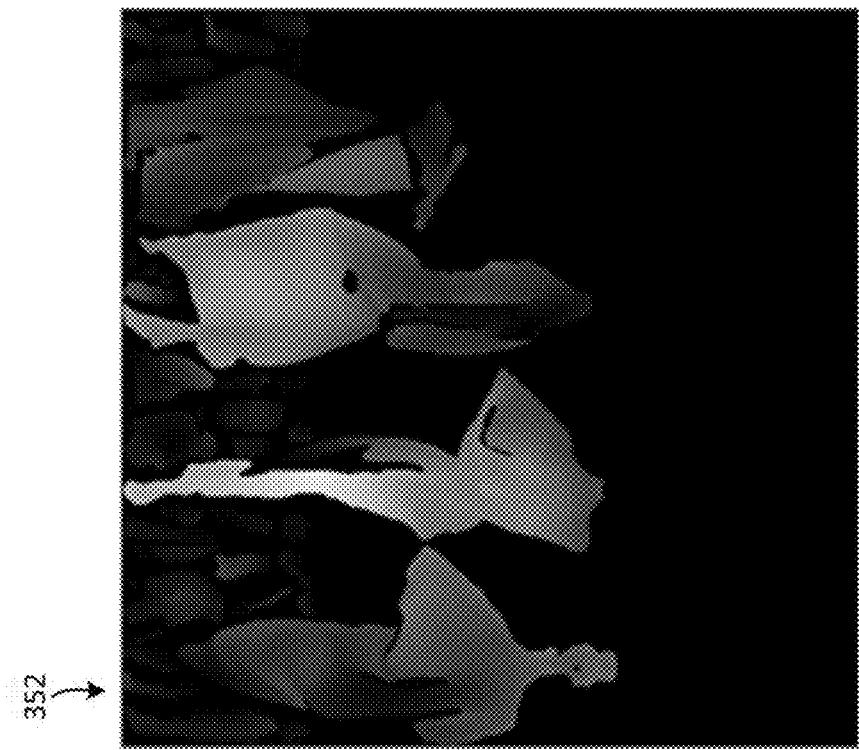
FIG. 5 illustrates an example of a geometry image in accordance with an embodiment.

In embodiments, the geometry image generation module 306 generates the geometry image 352 and the texture image generation module 308 generates the texture image 356, based on the input point cloud frame 350 and the occupancy map 334. An example of the geometry image 352 is illustrated in FIG. 5 and an example of the texture image 356 is illustrated in FIG. 6. In an embodiment, the geometry image 352 may be represented by a monochromatic frame of W×H in YUV420-8 bit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The video encoder 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is a one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the video encoder 203 may include a group dilation module 320 to form the padded texture image 360. Group dilation module 320 may be used, for example, to ensure spatial consistency between patches of various frames.

The video encoder 203 may include a video compression module 322 and a video compression module 324 for compressing the padded geometry image 354 and the padded texture image 360 into the compressed geometry image 362 and the compressed texture image 364, respectively.

The video encoder 203 may include an entropy compression module 318 for lossless encoding 366 of the occupancy map 334 and a video compression module 326 for lossy encoding 368 of the occupancy map 334. The state of the switch between lossless encoding 366 and lossy encoding 368 may be determined based on, for example, a bitrate of an incoming point cloud 350 or a bitrate of bitstream 374.

In embodiments, the video encoder 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The video encoder 203 may also include an auxiliary patch information compression module 312 for forming compressed auxiliary patch information 370 that is provided in the compressed bitstream 374 by the multiplexer 328.

FIG. 4 illustrates an example functional block diagram of a video decoder 210 according to an embodiment of the present disclosure.

As illustrated in FIG. 4, the video decoder 210 may receive the coded bitstream 374 from the video encoder 203 to obtain the compressed texture image 362, the compressed geometry image 364, the compressed occupancy map 372, and the compressed auxiliary patch information 370. The video decoder 210 may decode the compressed texture image 362, the compressed geometry image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the video decoder 210 may generate a reconstructed point cloud 474 based on the decompressed texture image 460, the decompressed geometry image 462, the decompressed occupancy map 464, and the decompressed auxiliary patch information 466.

In embodiments, the video decoder 210 may include a demultiplexer 402 that separates the compressed texture image 362, the compressed geometry image 364, the compressed occupancy map 372, and the compressed auxiliary patch information 370 of the compressed bitstream 374 received.

The video decoder 210 may include a video decompression module 404, a video decompression module 406, an occupancy map decompression module 408, and an auxiliary patch information decompression module 410 that decode the compressed texture image 362, the compressed geometry image 364, the compressed occupancy map 372, and the compressed auxiliary patch information 370, respectively.

The video decoder 210 may include a geometry reconstruction module 412 that obtains reconstructed (three dimensional) geometry 468 based on the decompressed geometry image 462, the decompressed occupancy map 464, and the decompressed auxiliary patch information 466.

The video decoder 210 may include a smoothing module 414 that smooths the reconstructed geometry 468 to obtain smoothed geometry 470. The smoothing procedure may aim at alleviating potential discontinuities that may arise at the patch boundaries due to compression artifacts.

The video decoder 210 may include a texture reconstruction module 416 for obtaining reconstructed texture 472 based on the decompressed texture image 460 and the smoothed geometry 470.

The video decoder 210 may include a color smoothing module 418 that smooths the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

After compression of geometry video, the point cloud may be reconstructed using the compressed geometry video and the corresponding occupancy map, which may also be referred to as a geometry-reconstructed cloud. Colors may be then transferred to the resulting geometry-reconstructed cloud. Geometry smoothing may be applied on the geometry-reconstructed cloud before color-transfer.

A goal of geometry smoothing may be to recover the geometry distorted at patch boundaries which is due to geometry compression as well as conversion of a high-resolution occupancy map to a lower-resolution one. However, quantization errors may affect the reconstructed depth values inside the patches, either close to or far from patch boundaries, which could lead to unsmooth reconstructed surfaces.

In the current V-PCC standard, smoothing may only be applied to patch boundaries. However, it may be beneficial to apply smoothing inside the patches too. Embodiments of the present disclosure relate to applying a smoothing filter not only to the patch boundaries, but also to regions near patch boundaries and inside the patches.

Figure 7B:
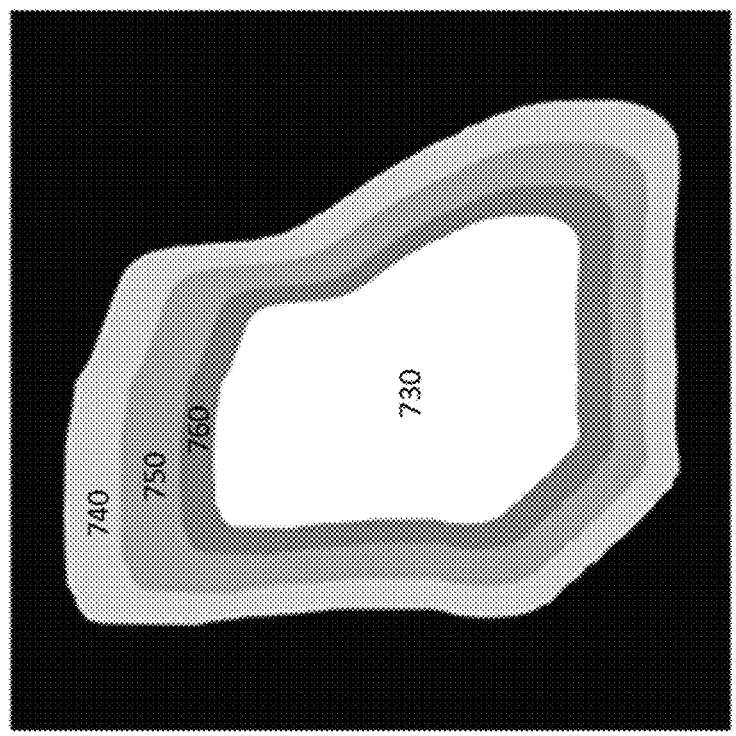
FIGS. 7A-7B illustrate exemplary embodiments of patch occupancy, in accordance with an embodiment.
Figure 7A:
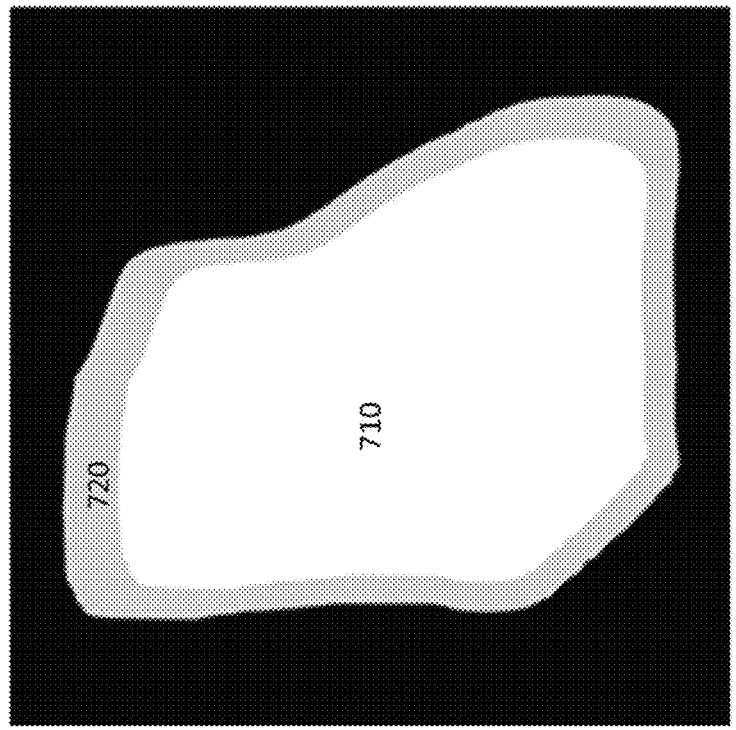

In one embodiment, one or several inner boundaries may be defined inside a patch. Each inner boundary may include a set of pixels of the occupancy map. FIGS. 7A-7B illustrate exemplary embodiments of patch occupancy images, in which occupied pixels are shown in white and gray, and unoccupied points are shown in black. FIG. 7A shows the occupancy of a patch 710 and its boundary points 720, according to an embodiment. FIG. 7B shows the occupancy of a patch 730 and three boundaries, specifically boundary points 740, which may correspond to boundary points 720, as well as two additional inner boundaries, which may include boundary points 750 and boundary points 760.

Embodiments of the present disclosure relate to applying one or more smoothing filters to all the inner boundaries as well as the actual patch boundary. These extra points are added to the list of points created by V-PCC for smoothing. The width of inner boundaries could differ. For example, to control the computational complexity, deeper inner boundaries could be thicker.

In another embodiment, smoothing is done with a different weight for different inner boundaries. The weight could be controlled adaptively using the corresponding depth values of the patch. For example, if the variance of the depth is relatively high inside a boundary, a larger smoothing weight could be used. These weights could also be computed locally or specified as fixed values for entire pixels belonging to a specific inner boundary.

In another embodiment, the patch boundary identification utilized by the V-PCC may be improved. To derive the first inner boundary, which may be immediately inside the patch boundary, and which may be referred to as a first extension, the set of patch boundary points may be removed from the set of occupied pixels, and then the first inner boundary may be found by finding the patch boundaries of the resulting occupancy map.

In another embodiment, the process described above can be applied more than once to create more inner boundaries.

The patch erosion process described above may be represented according to Equation 1, inset below:

$$L_1 = OM_1 - (OM_1 \ominus s) \quad \text{(Equation 1)}$$

The original occupancy map may be denoted by 〖OM〗_1, and the patch boundaries corresponding to 〖OM〗_1 may be denoted by L_1. ($X \ominus s$) may denote the erosion of occupancy map X by a structural element s, and X-Y may represent the set of occupied pixels that belong to X but not to Y.

Accordingly, the i-th (1<i) layer may be computed by using Equation 2 and Equation 3, inset below:

$$OM_{i+1} = OM_i - L_i \quad \text{(Equation 2)}$$

$$L_{i+1} = OM_{i+1} - (OM_{i+1} \ominus s) \quad \text{(Equation 3)}$$

According to an embodiment, different smoothing weights could be applied for different inner boundaries. For example, the smoothing weight may be reduced deeper inside the patch, because points inside patches may not need heavy smoothing compared to the points closer to the patch boundaries.

An example of a metadata syntax for signaling the embodiments discussed above is shown in Table 1 below:

TABLE 1

| enhanced_boundary_identification_metadata( ) { | Descriptor |
|---|---|
| if(enhanced_boundary_identification_enabled_flag) { | |
|     enhanced_boundary_identification_present_flag | u(1) |
|     if(enhanced_boundary_identification_present_flag) { | |
|         number_inner_boundaries | u(8) |
|         for(i = 0; i < number_of_inner_boundaries; ++i) { | |
|             smoothing_weight_per_inner_boundary[ i ] | u(8) |
|         } | |
|     } | |
| } | |

In Table 1 above, enhanced_boundary_identification_present_flag may indicate whether enhanced boundary identification is used or not.

number_of_inner_boundaries may indicate a number of inner boundaries.

smoothing_weight_per_inner_boundary[i] may indicate smoothing weight of the i-th inner boundary.

An example decoding process may take as inputs a number of patch inner boundaries and a smoothing weight per patch inner boundary.

After decoding the occupancy map, decoder A decoder, for example decoder 210, may find the patch boundary points, for example in the manner specified by the V-PCC standard. The decoder may then derive the occupied pixels belonging to each inner boundary one after the other. Geometry smoothing may be done for the points of each inner boundary using its corresponding decoded smoothing weight.

Figure 8:
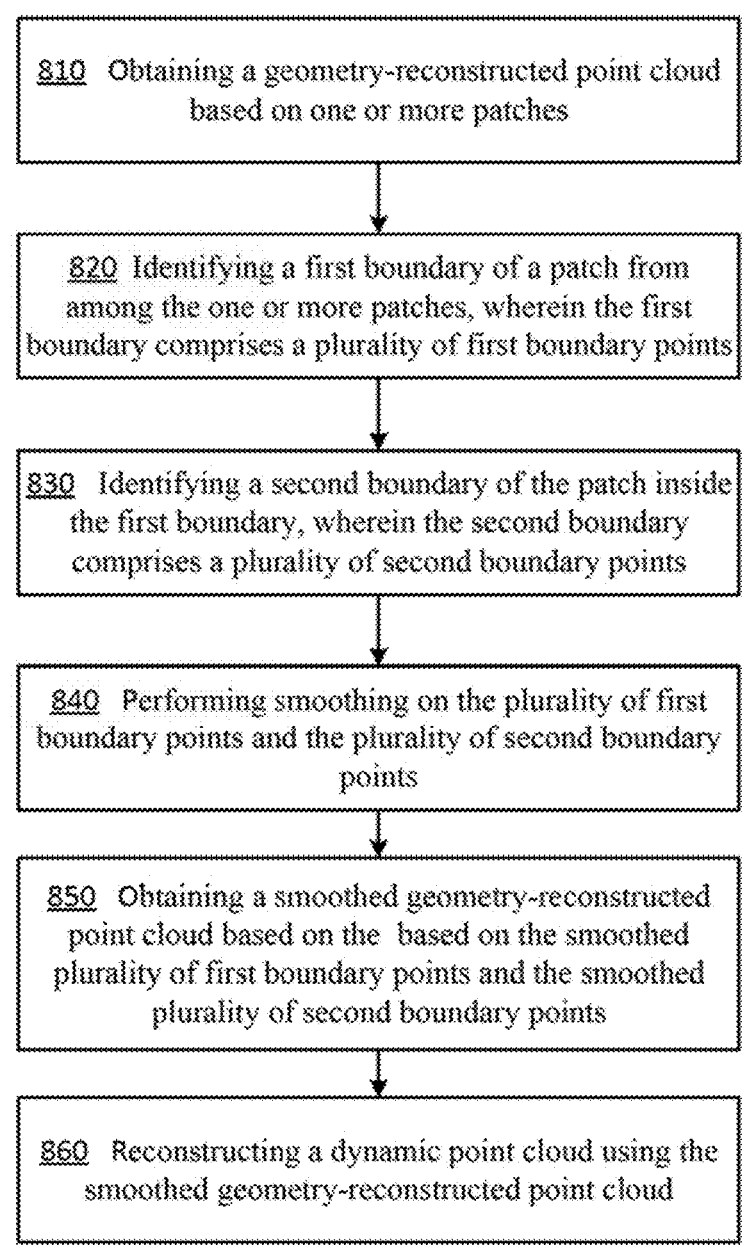
FIG. 8 is a flow diagram illustrating a process performed by an embodiment.

FIG. 8 is a flowchart of a method 800 of decoding a video stream encoded using video point cloud coding, according to embodiments. In some implementations, one or more process blocks of FIG. 8 may be performed by decoder 210. In some implementations, one or more process blocks of FIG. 8 may be performed by another device or a group of devices separate from or including the encoder 203, such as the encoder 203.

As shown in FIG. 8, in operation 810, the method 800 may include obtaining a geometry-reconstructed point cloud.

In operation 820, the method 800 may include identifying a first boundary of a patch from among the one or more patches, wherein the first boundary comprises a plurality of first boundary points.

In operation 830, the method 800 may include identifying a second boundary of the patch inside the first boundary, wherein the second boundary comprises a plurality of second boundary points.

In operation 840, the method 800 may include performing smoothing on the plurality of first boundary points and the plurality of second boundary points.

In operation 850, the method 800 may include obtaining a smoothed geometry-reconstructed point cloud based on the smoothed plurality of first boundary points and the smoothed plurality of second boundary points.

In operation 860, the method 800 may include reconstructing a dynamic point cloud using the smoothed geometry-reconstructed point cloud.

In an embodiment, the first boundary may be located at an edge of the patch.

In an embodiment, the method 800 may further include smoothing the plurality of first boundary points using a first smoothing filter; and smoothing the plurality of second boundary points using a second smoothing filter different from the first smoothing filter.

In an embodiment, a first smoothing weight of the first smoothing filter may be larger than a second smoothing weight of the second smoothing filter.

In an embodiment, the first boundary may have a first boundary thickness, and the second boundary may have a second boundary thickness larger than the first boundary thickness.

In an embodiment, the method 800 may further include identifying a third boundary of the patch inside the second boundary, wherein the third boundary may include a plurality of third boundary points; performing smoothing on the plurality of third boundary points; and obtaining a smoothed geometry-reconstructed point cloud based on the smoothed plurality of first boundary points, the smoothed plurality of second boundary points, and the smoothed plurality of third boundary points.

In an embodiment, the method 800 may further include smoothing the plurality of first boundary points using a first smoothing filter; smoothing the plurality of second boundary points using a second smoothing filter different from the first smoothing filter; and smoothing the plurality of third boundary points using a third smoothing filter different from the second smoothing filter and the first smoothing filter.

A first smoothing weight of the first smoothing filter may be larger than a second smoothing weight of the second smoothing filter, and the second smoothing weight of the second smoothing filter may be larger than a third smoothing weight of the third smoothing filter.

In an embodiment, the method 800 may further include obtaining an eroded patch by removing the plurality of first boundary points from the patch; identifying a boundary of the eroded patch located at an edge of the eroded patch, and determining the second boundary of the patch based on the boundary of the eroded patch.

In an embodiment, metadata of the video stream may indicate at least one from among a number of boundaries to be determined, and a smoothing weight to be applied to each of the boundaries.

Although FIG. 8 shows example blocks of the method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel.

Figure 9:
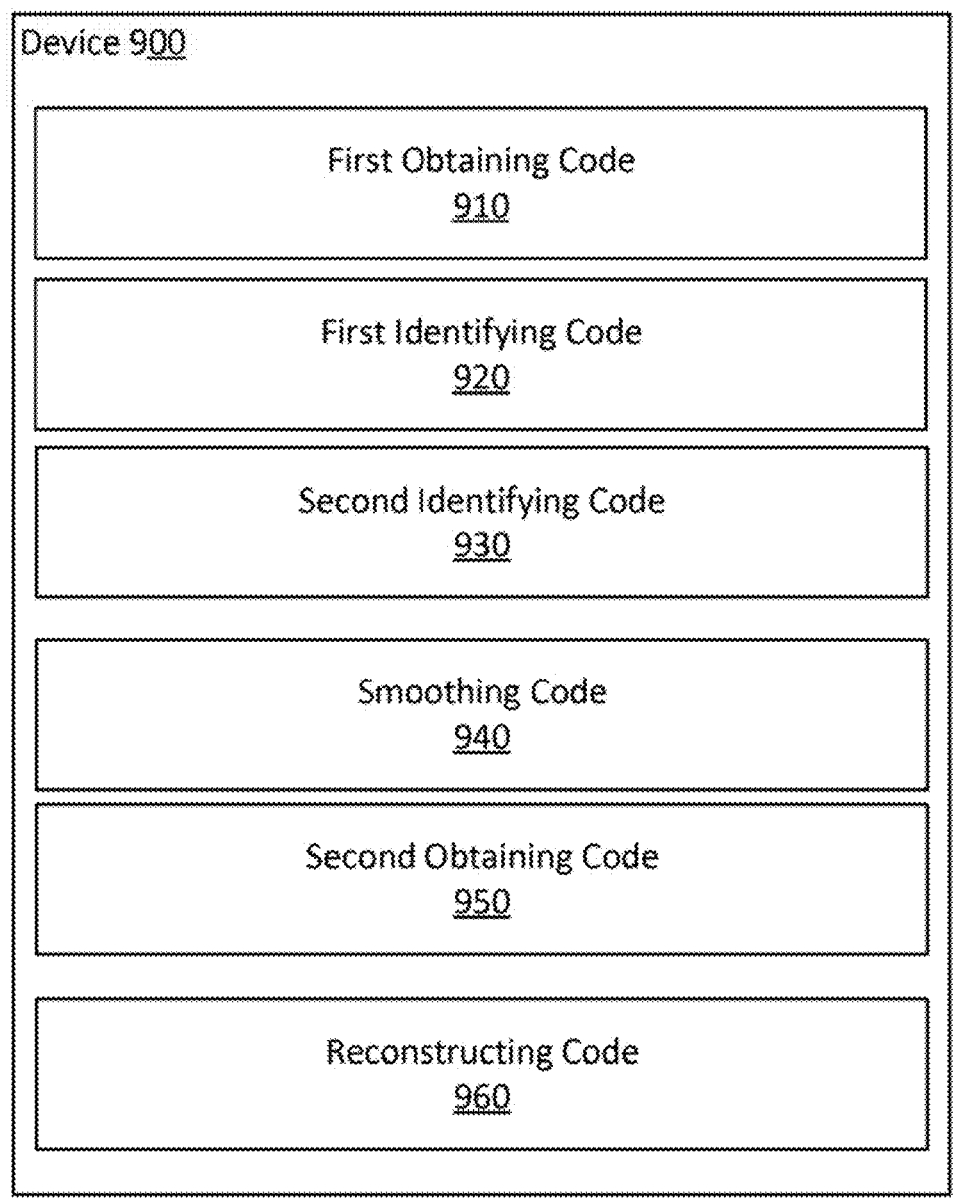
FIG. 9 is a diagram illustrating a device in accordance with an embodiment.

FIG. 9 is a diagram of an apparatus 900 for decoding a video stream encoded using video point cloud coding, according to embodiments. As shown in FIG. 9, the apparatus 900 includes first obtaining code 910, first identifying code 920, second identifying code 930, smoothing code 940, second obtaining code 950, and reconstructing code 960.

The first obtaining code 910 may be configured to cause the at least one processor to obtain a geometry-reconstructed point cloud based on one or more patches.

The first identifying code 920 may be configured to cause the at least one processor to identify a first boundary of a patch from among the one or more patches, wherein the first boundary comprises a plurality of first boundary points.

The second identifying code 930 may be configured to cause the at least one processor to identify a second boundary of the patch inside the first boundary, wherein the second boundary comprises a plurality of second boundary points.

The smoothing code 940 may be configured to cause the at least one processor to perform smoothing on the plurality of first boundary points and the plurality of second boundary points.

The second obtaining code may be 950 configured to cause the at least one processor to obtain a smoothed geometry-reconstructed point cloud based on the smoothed plurality of first boundary points and the smoothed plurality of second boundary points.

The reconstructing code 960 may be configured to cause the at least one processor to reconstruct a dynamic point cloud using the smoothed geometry-reconstructed point cloud.

The techniques, described above, can be implemented as computer software using computer-readable instructions and physically stored in one or more computer-readable media. For example, FIG. 10 shows a computer system 1000 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 10 for computer system 1000 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, data-glove, joystick 1005, microphone 1006, scanner 1007, camera 1008.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1010, data glove, or joystick 1005, but there can also be tactile feedback devices that do not serve as input devices). For example, such devices may be audio output devices (such as: speakers 1009, headphones (not depicted)), visual output devices (such as screens 1010 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1000 can also include human accessible storage devices and their associated media such as optical media including CD/DVD ROM/RW 1020 with CD/DVD or the like media 1021, thumb-drive 1022, removable hard drive or solid state drive 1023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1000 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1049 (such as, for example USB ports of the computer system 1000; others are commonly integrated into the core of the computer system 1000 by attachment to a system bus as described below (for example Ethernet interface into a PC computer system or cellular network interface into a smartphone computer system). Using any of these networks, computer system 1000 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 1055. Certain protocols and protocol stacks can be used on each of those networks and network interfaces as described above.

Aforementioned human interface devices, human-accessible storage devices, and network interfaces 1054 can be attached to a core 1040 of the computer system 1000.

The core 1040 can include one or more Central Processing Units (CPU) 1041, Graphics Processing Units (GPU) 1042, specialized programmable processing units in the form of Field Programmable Gate Areas (FPGA) 1043, hardware accelerators for certain tasks 1044, and so forth. These devices, along with Read-only memory (ROM) 1045, Random-access memory 1046, internal mass storage such as internal non-user accessible hard drives, SSDs, and the like 1047, may be connected through a system bus 1048. In some computer systems, the system bus 1048 can be accessible in the form of one or more physical plugs to enable extensions by additional CPUs, GPU, and the like. The peripheral devices can be attached either directly to the core's system bus 1048, or through a peripheral bus 1049. Architectures for a peripheral bus include PCI, USB, and the like. A graphics adapter 1050 may be included in the core 1040.

CPUs 1041, GPUs 1042, FPGAs 1043, and accelerators 1044 can execute certain instructions that, in combination, can make up the aforementioned computer code. That computer code can be stored in ROM 1045 or RAM 1046. Transitional data can be also be stored in RAM 1046, whereas permanent data can be stored for example, in the internal mass storage 1047. Fast storage and retrieve to any of the memory devices can be enabled through the use of cache memory, that can be closely associated with one or more CPU 1041, GPU 1042, mass storage 1047, ROM 1045, RAM 1046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1000, and specifically the core 1040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1040 that are of non-transitory nature, such as core-internal mass storage 1047 or ROM 1045. The software implementing various embodiments of the present disclosure can be stored in such devices and executed by core 1040. A computer-readable medium can include one or more memory devices or chips, according to particular needs. The software can cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system can provide functionality as a result of logic hardwired or otherwise embodied in a circuit (for example: accelerator 1044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of decoding a video stream encoded using video point cloud coding, the method being performed by at least one processor and comprising:
obtaining a geometry-reconstructed point cloud based on one or more patches;
identifying a first boundary and a second boundary of a patch from among the one or more patches, wherein each of the first boundary and the second boundary comprises a plurality of boundary points, and wherein the second boundary is an inner boundary within the first boundary;
performing smoothing on the plurality of boundary points in the first boundary and the second boundary;
obtaining a smoothed geometry-reconstructed point cloud based on the smoothed plurality of boundary points; and
reconstructing a dynamic point cloud using the smoothed geometry-reconstructed point cloud.

2. The method of claim 1, wherein the first boundary is located at an edge of the patch.

3. The method of claim 1, further comprising:
smoothing the plurality of boundary points in the first boundary using a first smoothing filter; and
smoothing the plurality of boundary points in the second boundary using a second smoothing filter different from the first smoothing filter,
wherein a first smoothing weight of the first smoothing filter is larger than a second smoothing weight of the second smoothing filter.

4. The method of claim 1, further comprising:
identifying a third boundary of the patch inside the second boundary;
performing smoothing on a plurality of boundary points in the third boundary; and
obtaining the smoothed geometry-reconstructed point cloud based on the smoothed plurality of boundary points in the first boundary, the second boundary, and the third boundary.

5. The method of claim 4, further comprising:
smoothing the plurality of boundary points in the first boundary using a first smoothing filter;
smoothing the plurality of boundary points in the second boundary using a second smoothing filter different from the first smoothing filter; and
smoothing the plurality of boundary points in the third boundary using a third smoothing filter different from the second smoothing filter and the first smoothing filter.

6. The method of claim 5, wherein a first smoothing weight of the first smoothing filter is larger than a second smoothing weight of the second smoothing filter, and
wherein the second smoothing weight of the second smoothing filter is larger than a third smoothing weight of the third smoothing filter.

7. The method of claim 1, further comprising:
obtaining an eroded patch by removing the plurality of boundary points in the first boundary from the patch;
identifying a boundary of the eroded patch located at an edge of the eroded patch; and
determining the second boundary of the patch based on the boundary of the eroded patch.

8. The method of claim 1, wherein metadata of the video stream indicates at least one from among a number of boundaries to be determined, and a smoothing weight to be applied to each of the boundaries.

9. An apparatus for decoding a video stream encoded using video point cloud coding, the apparatus comprising:
at least one memory configured to store program code; and
at least one processor configured to read the program code and operate as instructed by the program code, the program code comprising:
first obtaining code configured to cause the at least one processor to obtain a geometry-reconstructed point cloud based on one or more patches;
first identifying code configured to cause the at least one processor to identify a first boundary and a second boundary of a patch from among the one or more patches, wherein each of the first boundary and the second boundary comprises a plurality of boundary points, and wherein the second boundary is an inner boundary within the first boundary;
smoothing code configured to cause the at least one processor to perform smoothing on the plurality of boundary points in the first boundary and the second boundary;
second obtaining code configured to cause the at least one processor to obtain a smoothed geometry-reconstructed point cloud based on the smoothed plurality of boundary points; and
reconstructing code configured to cause the at least one processor to reconstruct a dynamic point cloud using the smoothed geometry-reconstructed point cloud.

10. The apparatus of claim 9, wherein the first boundary is located at an edge of the patch.

11. The apparatus of claim 9, wherein the smoothing code comprises first smoothing code configured to cause the at least one processor to smooth the plurality of boundary points in the first boundary using a first smoothing filter,
wherein the program code further comprises second smoothing code configured to cause the at least one processor to smooth the plurality of boundary points in the second boundary using a second smoothing filter different from the first smoothing filter, and
wherein a first smoothing weight of the first smoothing filter is larger than a second smoothing weight of the second smoothing filter.

12. The apparatus of claim 9, wherein the smoothing code comprises first smoothing code, and
wherein the program code further comprises:
second identifying code configured to cause the at least one processor to identify a third boundary of the patch inside the second boundary;
second smoothing code configured to cause the at least one processor to smooth a plurality of boundary points in the third boundary; and
third obtaining code configured to cause the at least one processor to obtain the smoothed geometry-reconstructed point cloud based on the smoothed plurality of boundary points in the first boundary, the second boundary, and the third boundary.

13. The apparatus of claim 12, wherein the smoothing code comprises fourth smoothing code configured to cause the at least one processor to smooth the plurality of boundary points in the first boundary using a first smoothing filter, and wherein the program code further comprises:
fifth smoothing code configured to cause the at least one processor to smooth the plurality of boundary points in the second boundary using a second smoothing filter different from the first smoothing filter; and
sixth smoothing code configured to cause the at least one processor to smooth the plurality of boundary points in the third boundary using a third smoothing filter different from the second smoothing filter and the first smoothing filter.

14. The apparatus of claim 9, wherein the program code further comprises:
fourth obtaining code configured to cause the at least one processor to obtain an eroded patch by removing the plurality of boundary points in the first boundary from the patch;
fifth obtaining code configured to cause the at least one processor to identify a boundary of the eroded patch located at an edge of the eroded patch, and
determining code configured to cause the at least one processor to determine the second boundary of the patch based on the boundary of the eroded patch.

15. The apparatus of claim 9, wherein metadata of the video stream indicates at least one from among a number of boundaries to be determined, and a smoothing weight to be applied to each of the boundaries.

16. A non-transitory computer-readable medium storing computer instructions for decoding a video stream encoded using video point cloud coding that, when executed by at least one processor, cause the at least one processor to:
obtain a geometry-reconstructed point cloud based on one or more patches;
identify a first boundary and a second boundary of a patch from among the one or more patches, wherein each of the first boundary and the second boundary comprises a plurality of boundary points, and wherein the second boundary is an inner boundary within the first boundary;
perform smoothing on the plurality of boundary points in the first boundary and the second boundary;
obtain a smoothed geometry-reconstructed point cloud based on the smoothed plurality of boundary points; and
reconstruct a dynamic point cloud using the smoothed geometry-reconstructed point cloud.

17. The non-transitory computer-readable medium of claim 16, wherein the computer instructions further cause the at least one processor to:
identify a third boundary of the patch inside the second boundary;
performing smoothing on a plurality of boundary points in the third boundary; and
obtaining the smoothed geometry-reconstructed point cloud based on the smoothed plurality of boundary points in the first boundary, the second boundary, and the third boundary.

18. The non-transitory computer-readable medium of claim 17, wherein the computer instructions further cause the at least one processor to:
smooth the plurality of boundary points in the first boundary using a first smoothing filter;
smooth the plurality of boundary points in the second boundary using a second smoothing filter different from the first smoothing filter; and
smooth the plurality of boundary points in the third boundary using a third smoothing filter different from the second smoothing filter and the first smoothing filter.

19. The non-transitory computer-readable medium of claim 18, wherein a first smoothing weight of the first smoothing filter is larger than a second smoothing weight of the second smoothing filter, and
wherein the second smoothing weight of the second smoothing filter is larger than a third smoothing weight of the third smoothing filter.

20. The non-transitory computer-readable medium of claim 16, wherein the computer instructions further cause the at least one processor to:
obtain an eroded patch by removing the plurality of boundary points in the first boundary from the patch;
identify a boundary of the eroded patch located at an edge of the eroded patch; and
determine the second boundary of the patch based on the boundary of the eroded patch.

* * * * *